(12) United States Patent
Wilson (10) Patent No.: US 7,891,318 B2
(45) Date of Patent: Feb. 22, 2011

(54) FOOD/BEVERAGE DISPENSING APPARATUS FOR TRAVELING PETS

(76) Inventor: Stephen Wilson, 53 Fox Run La., Mystic, CT (US) 06355

( * ) Notice: Subject to any disclaimer, the term of this patent is extended or adjusted under 35 U.S.C. 154(b) by 666 days.

(21) Appl. No.: 11/947,200

(22) Filed: Nov. 29, 2007

(65) Prior Publication Data
US 2009/0139455 A1 Jun. 4, 2009

(51) Int. Cl.
*A01K 5/00* (2006.01)
(52) U.S. Cl. ............... 119/61.57; 119/475; 119/464; 248/311.2
(58) Field of Classification Search ............ 119/61.57, 119/61.53, 475, 464, 515, 521; 47/40; 248/689, 248/27.8, 125.8, 132, 208, 236, 220.22, 281.11, 248/318, 283.1, 327, 309.1, 333, 311.2
See application file for complete search history.

(56) References Cited

U.S. PATENT DOCUMENTS

| | | | | |
|---|---|---|---|---|
| 1,930,673 A * | 10/1933 | Consolazio | ............... | 248/315 |
| 2,302,737 A * | 11/1942 | Bearden | ................ | 248/208 |
| 3,361,116 A * | 1/1968 | Daniel et al. | ............ | 119/63 |
| 4,205,629 A * | 6/1980 | Wix | ................ | 119/51.5 |
| 4,623,113 A * | 11/1986 | Studebaker | ............ | 248/311.2 |
| 4,951,910 A * | 8/1990 | March | ................ | 248/311.2 |
| 5,014,956 A * | 5/1991 | Kayali | ................ | 248/311.2 |
| 5,368,267 A * | 11/1994 | Howard | ............. | 248/231.41 |
| 5,467,733 A * | 11/1995 | Messina | ............ | 119/464 |
| 5,586,413 A * | 12/1996 | Sharon | ................ | 47/67 |
| 5,697,587 A * | 12/1997 | Israel | ................. | 248/214 |
| D393,159 S * | 4/1998 | Richards et al. | ......... | D6/403 |
| 5,738,042 A * | 4/1998 | King | ................. | 119/464 |
| 5,855,184 A * | 1/1999 | Eichler et al. | ........... | 119/51.5 |
| 6,142,101 A * | 11/2000 | Pelsor | ................ | 119/61.54 |
| 6,299,118 B1 * | 10/2001 | Farrell | ................ | 248/327 |
| 6,575,416 B1 * | 6/2003 | Avinger | ............. | 248/307 |
| 7,059,271 B2 * | 6/2006 | Santa Cruz et al. | ...... | 119/60 |
| 7,455,031 B2 * | 11/2008 | Axelrod | ............. | 119/464 |
| 2005/0217597 A1 * | 10/2005 | Axelrod | ............. | 119/464 |
| 2006/0249089 A1 * | 11/2006 | Behunin | ............. | 119/61.57 |
| 2009/0056636 A1 * | 3/2009 | Deese et al. | ........... | 119/61.53 |

* cited by examiner

*Primary Examiner* — Yvonne R. Abbott
(74) *Attorney, Agent, or Firm* — Cantor Colburn LLP (57) ABSTRACT

A pet food/beverage dispensing apparatus includes; a vertical positioning member configured to at least partially surround at least one substantially vertical fixing member, a height extending portion coupled to the vertical positioning member via a refastenable connector, and a dish receptacle which is configured to retain a dish and is coupled to the height extending portion, wherein the vertical positioning member and the height extending portion are configured to substantially fix the dish receptacle in a predetermined position.

13 Claims, 6 Drawing Sheets

FOOD/BEVERAGE DISPENSING APPARATUS FOR TRAVELING PETS

BACKGROUND OF THE INVENTION

1. Field of the Invention

The present invention relates generally to an apparatus for providing a food/beverage to a pet, and more particularly to a pet food or beverage dispensing apparatus which may be conveniently configured for travel.

2. Description of the Related Art

Millions of people worldwide enjoy the benefits of pet ownership. Occasionally those pet owners experience the need or desire to travel with their pets for extended periods of time. In the United States, pet owners often travel with their pets in a car, truck or other vehicle.

Similar to their human owners, pets such as dogs, cats and other air-breathing animals require water, or other beverages, to hydrate themselves and food for energy. These requirements are not obviated while traveling, and pet owners must find a way to hydrate and/or feed their animal companions during travel.

One method is to stop the vehicle to allow a pet to drink or eat from a food or water bowl. Unfortunately, this method may undesirably extend the travel time of a particular trip.

An alternative method is to allow the pet to drink or eat from a food or water bowl placed on the floor or seating area of the moving vehicle. Unfortunately, this method can result in overturning of the food or water bowl, either by sudden movements of the vehicle or by accidental manipulation by the pet. This is undesirable in that pet food from the food bowl may be scattered throughout the vehicle or the beverage in the water bowl may be splashed on the vehicle's upholstery. In addition, the pet may step in the food or water bowls and track the contents throughout the vehicle.

Accordingly, it is desirable to provide an apparatus which allows a pet to easily receive food or beverages during travel in a vehicle while preventing spillage of the food or beverages.

BRIEF SUMMARY OF THE INVENTION

The foregoing discussed drawbacks and deficiencies of the prior art are overcome or alleviated by providing an exemplary embodiment of a pet food/beverage dispensing apparatus including; a vertical positioning member configured to at least partially surround at least one substantially vertical fixing member, a height extending portion coupled to the vertical positioning member via a refastenable connector, and a dish receptacle which is configured to removably retain a dish and is coupled to the height extending portion, wherein the vertical positioning member and the height extending portion are configured to substantially fix the dish receptacle in a predetermined position.

In one exemplary embodiment, the apparatus further includes; at least one expansion component disposed in at least one of the vertical positioning member, the height extending portion and the dish receptacle.

In one exemplary embodiment, the apparatus further includes; at least one positionable joint disposed in at least one of the vertical positioning member, the height extending portion and the dish receptacle.

In one exemplary embodiment, the vertical positioning member includes; a first prong, a connecting body coupled to the first prong, and a second prong coupled to the connecting body, wherein the height extending section is coupled to the vertical positioning member via the connecting body.

In one exemplary embodiment, the vertical positioning member includes a first connecting body, a second connecting body coupled to the first connecting body, a third connecting body disposed substantially opposite to the first connecting body, and a fourth connecting body coupled to the third connecting body and disposed substantially opposite to the second connecting body, wherein the first and second connecting bodies together form a shape having at least two projections, and wherein the third and fourth connecting bodies together form a shape having at least two projections and further wherein the at least two projections from the first and second connecting bodies are configured to be aligned with the at least two projections from the third and fourth connecting bodies.

In one exemplary embodiment the height extending section includes; a first portion coupled to the vertical positioning member, a second portion extending substantially vertically from the first portion, and a third portion extending substantially horizontally from the second portion, wherein the dish receptacle is coupled to the third portion.

In one exemplary embodiment, the apparatus includes; at least one positionable joint disposed between one of the first portion and the second portion and the second portion and the third portion.

In one exemplary embodiment, the dish receptacle comprises a closed loop having a first circumference.

In one exemplary embodiment, the apparatus further includes; a dish configured to be supported by the dish retaining receptacle.

In one exemplary embodiment, the dish includes; a bottom having a second circumference, and at least one sidewall having at least one side thereof coupled to the bottom and another side defining an opening having a third circumference, wherein the second circumference is substantially smaller than the first circumference and the third circumference is substantially larger than the first circumference.

In one exemplary embodiment, the dish includes; a bottom having a second circumference, at least one sidewall extending substantially perpendicularly from the bottom, and a lid having a third circumference coupled to the at least one sidewall, wherein the second circumference is substantially smaller than the first circumference and the third circumference is substantially larger than the first circumference.

In one exemplary embodiment, the dish includes; a bottom having a second circumference, at least one sidewall having a first portion extending from the bottom and a second portion extending from the first portion, and a lid having a third circumference coupled to the second portion of the sidewall, wherein the second circumference is substantially smaller than the first circumference and the third circumference is substantially larger than the first circumference, and wherein the first portion of the at least one sidewall is configured to have a semicircular cross-sectional profile.

In one exemplary embodiment, the dish further includes; a lid including; a lid body, at least one outward projection disposed on the lid body, the outward projection increasing the circumference of the lid, and at least one inward projection disposed on the lid body, the inward projection configured to reduce spillage from the dish.

In one exemplary embodiment, the height extending section is configured to fit the contours of a vehicle seatback.

In one exemplary embodiment, the apparatus further includes one of a hook and loop fastener coupled to the height extending section and the other of the hook and loop fastener is coupled to the vehicle seatback.

In another exemplary embodiment of the present invention, a method for providing a food/beverage to a pet includes;

disposing a vertical positioning member to at least partially surround at least one substantially vertical fixing member, connecting a height extending section to the vertical positioning member, wherein the height extending section is coupled to a dish receptacle, disposing a dish in the dish receptacle, and depositing one of food or a beverage into the dish.

In one exemplary embodiment, the depositing one of food or beverage into the dish is performed before the disposing of the dish in the dish receptacle.

In another exemplary embodiment, a pet food/beverage dispensing apparatus includes; a vertical positioning member including, a first prong disposed at a ninety degree angle to a connecting body, and a second prong connected at a ninety degree angle to the connecting body, wherein the first and second prongs and the connecting body are configured to at least partially surround at least one substantially vertical fixing member, a height extending portion coupled to the vertical positioning member via a refastenable connector, and contoured to fit a back of a vehicle seat, the height extending portion including; a first portion coupled to the connecting body via the refastenable connector, a second portion extending substantially perpendicularly from the first portion, a third portion extending substantially perpendicularly from the second portion, and at least one positionable joint disposed between one of the first portion and the second portion and the second portion and the third portion, a dish receptacle which is configured to removably retain a dish and is coupled to the third portion of the height extending portion, a dish configured to be retained by the dish receptacle, and wherein the vertical positioning member and the height extending portion are configured to substantially fix the dish receptacle in a predetermined position.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is an apparatus for providing a food/beverage to a pet, and more particularly to a pet food or beverage dispensing apparatus which may be configured to retain its contents and provide easy access to a pet while traveling.

Figure 1:
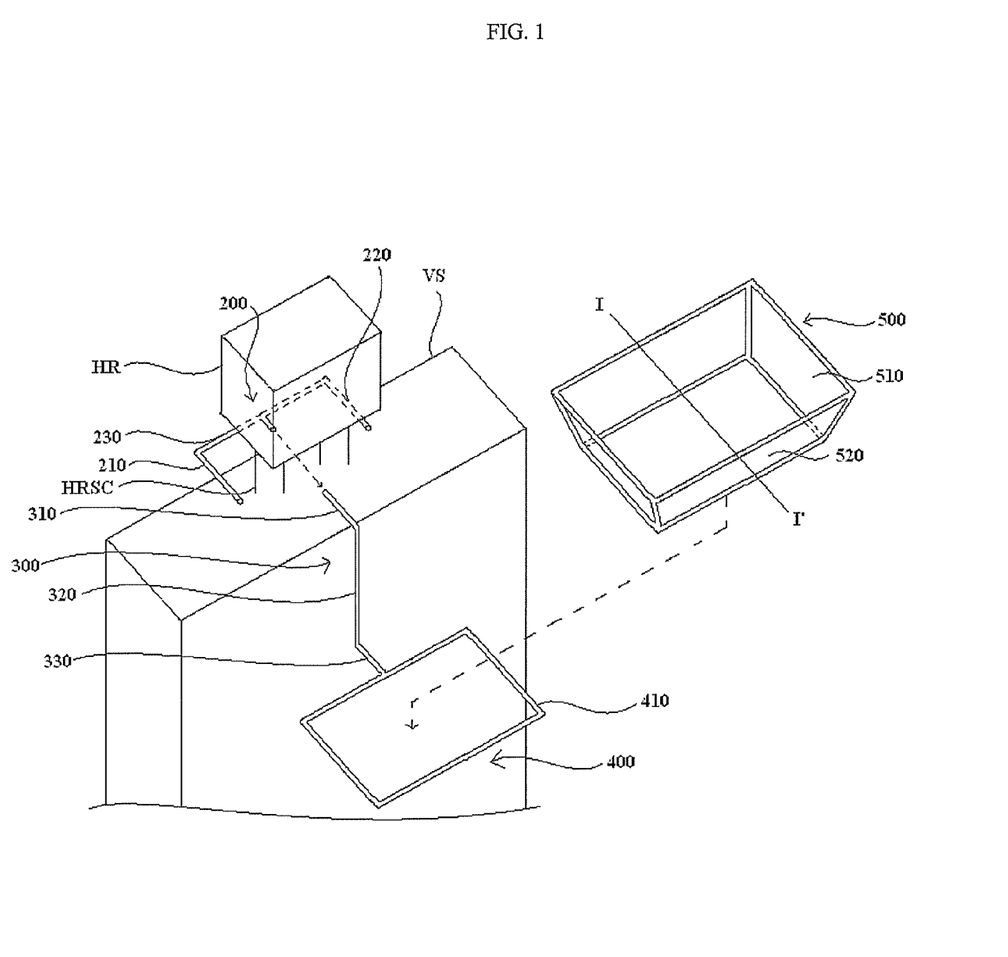
FIG. 1 is an exploded view of a first exemplary embodiment of a pet food/beverage dispensing apparatus according to the present invention.

Referring now to FIG. 1, there is shown an exploded view of a first exemplary embodiment of a pet food/beverage dispensing apparatus 100 according to the present invention disposed in relation to the back of a vehicle seat VS and a headrest HR.

As shown in FIG. 1, an exemplary embodiment of a pet food/beverage dispensing apparatus 100 includes a vertical positioning member 200, a height extending section 300, a dish receptacle 400 and a dish 500.

In the present exemplary embodiment, the vertical positioning member 200 includes first and second prongs 210 and 220, respectively, for coupling the pet food/beverage dispensing apparatus 100 to a fixing member which may be disposed substantially vertically. The first and second prongs 210 and 220 are connected to a connecting body 230.

In the present exemplary embodiment, the height extending section 300 includes a first portion 310 extending substantially horizontally away from the vertical positioning member 200, a second portion 320 connected to, and extending substantially vertically away from, the first portion 310 and a third portion 330 connected to, and extending substantially horizontally away from, the second portion 320.

In the present exemplary embodiment, the dish receptacle 400 includes a loop 410 connected to the third portion 330 of the height extending section 300.

In the present exemplary embodiment, the dish 500 is configured to have an opening 510 having a first circumference and a bottom surface 520 having a second circumference. In the present exemplary embodiment, the first circumference is substantially larger than a circumference of the loop 410 of the dish receptacle 400 and the second circumference is substantially smaller than the circumference of the loop 410 of the dish receptacle 400.

The pet food/beverage dispensing apparatus 100 may be formed from any material as would be apparent to one of ordinary skill in the art. In one exemplary embodiment the various components of the pet food/beverage dispensing apparatus 100 may be formed from molded or extruded plastic.

In one exemplary embodiment of operation, the pet food/beverage dispensing apparatus 100 is placed in proximity to the back of the vehicle seat VS. The vehicle seat includes the headrest HR mounted on two headrest supporting columns HRSC extending from the bottom of the headrest into the seatback, these supporting columns HRSC function as substantially vertical fixing members for the vertical positioning member 200. The vertical positioning member 200 is placed in front of and below the headrest HR so that the first and second prongs 210 and 220 are disposed on an outside of the two supporting columns HRSC of the headrest. The height extending section 300 is then connected to the connecting body 230 by any of several methods well known in the art. In one exemplary embodiment, the height extending section 300 is connected to the connecting body 230 by an easily fastenable and unfastenable connector as known in the art.

Thereby, the pet food/beverage dispensing apparatus 100 is prevented from moving in a horizontal plane by the interaction between the headrest supporting columns HRSC, the connecting body 230, the prongs 210 and 220 and the height extending section 300; e.g., the pet food/beverage dispensing apparatus 100 is prevented from moving horizontally left and right by the prongs 210 and 220 hitting the head rest support columns HRSC, and the pet food/beverage dispensing apparatus 100 is prevented from moving horizontally forward and backward by the connecting member 230 hitting the head rest support columns HRSC and the height extending section 300 hitting the vehicle seat VS.

An alternative exemplary embodiment which may be configured for seatbacks wherein the headrest is connected to the seatback by a single column will be described in more detail with respect to FIG. 4.

The first portion 310 of the height extending section 300 extends underneath the headrest HR to connect with the connecting body 230. The first portion 310 is long enough to extend from the connecting body 230 to the back of the vehicle seat VS where it is connected to the second portion 320. The second portion 320 extends vertically away from the first portion 310. The length of the second portion 320 is selected to position the third portion 330 at a height which will provide a pet convenient access to the dish 500 when it is inserted in the dish receptacle 400. In one exemplary embodiment the second portion 320 is contoured to closely follow the shape of the vehicle seatback. The third portion 330 extends substantially horizontally away from the second portion 320 and connects the height extending portion 300 to the dish receptacle 400.

In an alternative exemplary embodiment the first and third portions 310 and 330, respectively, may be omitted or their structural equivalents may be disposed on other components of the pet food/beverage dispensing apparatus as would be apparent to one of ordinary skill in the art; e.g., the first portion 310 may by replaced by a structural equivalent disposed on the connecting body 230 and/or the third portion 330 may be replaced by a structural equivalent disposed on the dish receptacle 400.

Exemplary embodiments also include configurations wherein the second portion 320 may be coupled to the vehicle seat VS by a restraining means as would be readily apparent to one of ordinary skill in the art. In one exemplary embodiment the second portion 320 includes one of a hook and loop fastener and the other one of the hook and loop fastener is coupled to the vehicle seat VS. Thereby, the height extending portion 300 may be substantially restrained with respect to the vehicle seat VS.

The dish receptacle 400 is coupled to the third portion 330 of the height extending portion 300. In one exemplary embodiment, the dish receptacle and the third portion 330 are coupled by a connector, which may be easily and repeatably fastened and unfastened. In an alternative exemplary embodiment, the height extending section 300 and the dish receptacle 400 may be formed as an indivisible, unitary component, e.g., through a single molding process or by a single casting process. In the current exemplary embodiment, the dish receptacle 400 includes the loop 410 having a predetermined circumference.

The dish 500 includes the opening 510 having a circumference substantially larger than the circumference of the loop 410 and a bottom surface 520 having a circumference substantially smaller than the circumference of the loop 410. The dish 500 is inserted vertically into the dish receptacle 400 where it is retained thereby. The dish 500 is held vertically about a portion thereof wherein the circumference of the dish 500 is equal to the circumference of the loop 410.

Alternative exemplary embodiments include configurations wherein the dish receptacle 400 and/or the dish 500 include various other dish retaining means as would be obvious to one of ordinary skill in the art, e.g. a hook and slot retention system wherein hooks are disposed on the dish receptacle 400 and inserted into slots in the dish 500.

Alternative exemplary embodiments also include configurations wherein the dish receptacle includes loops 410 of various shapes or wherein the loop 410 is not a closed loop. Alternative exemplary embodiments also include configurations wherein the dish 500 is made in various shapes or sizes as will be discussed in more detail with respect to FIGS. 3A-C and 4.

The pet owner may fill the dish 500 with food or beverages and the dish 500 will be substantially maintained in position by the vertical positioning member 200, the height extending section 300 and the dish receptacle 400, thereby reducing, or effectively preventing, spillage of the contents of the dish 500. In addition, the dish 500 will be maintained off of the floor or seats of the vehicle, thereby reducing, or effectively preventing, the pet from stepping in the contents of the dish 500 and tracking said contents throughout the vehicle.

Although the exemplary embodiments describe a dish 500, it would be apparent to one of ordinary skill in the art that other similar containers having a large opening capable of allowing a pet to drink therefrom could be used; e.g., a bowl, an opened rubber bladder, etc. In one exemplary embodiment the dish 500 may be a container with an opening capable of allowing a pet to insert a portion of their tongue or muzzle therein.

Figure 2:
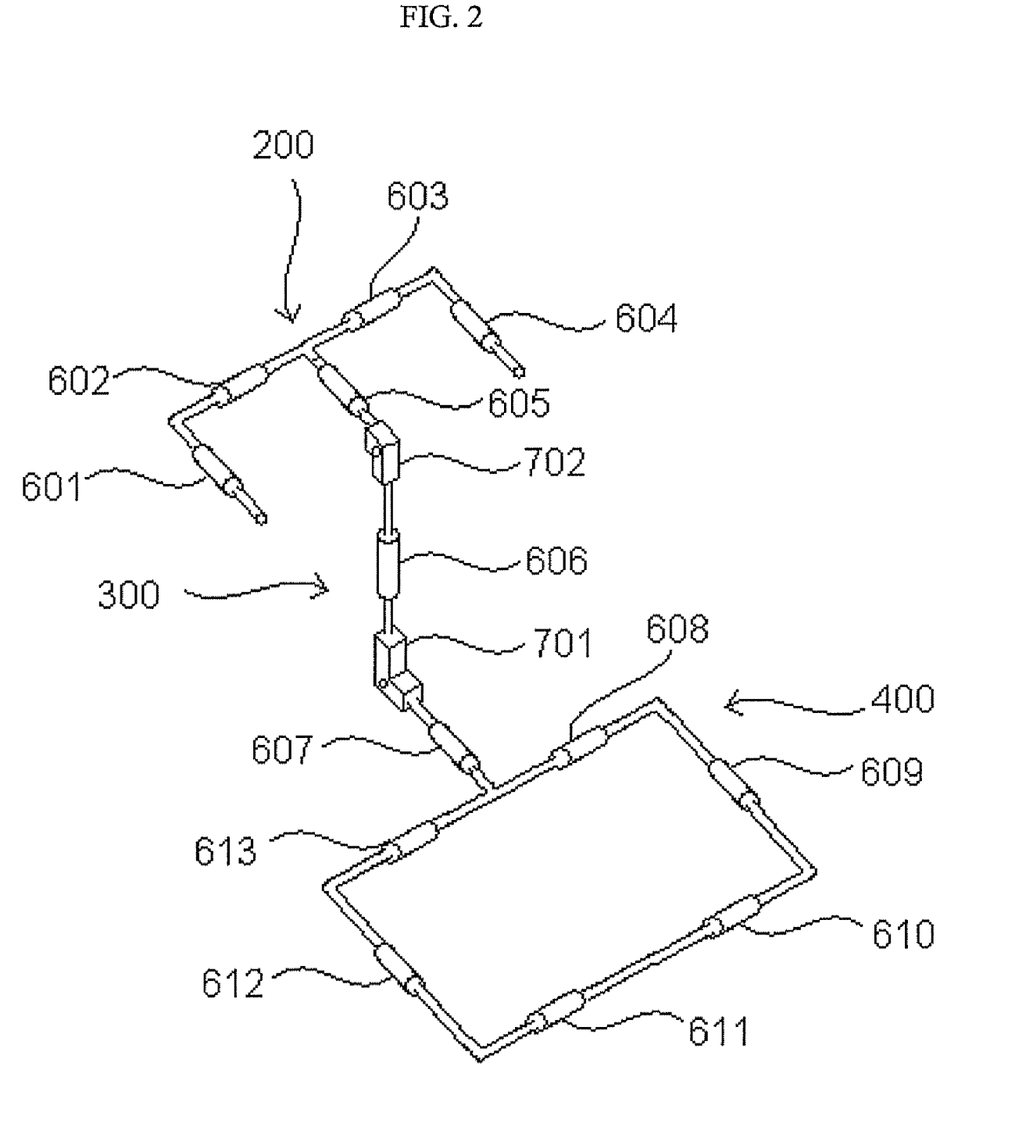
FIG. 2 is front perspective view of a second exemplary embodiment of a pet food/beverage dispensing apparatus according to the present invention.

Referring now to FIG. 2, a second exemplary embodiment of a pet food/beverage dispensing apparatus includes a plurality of expansion components 600, including expansion components 601-613, and a plurality of positionable joints 700, including positionable joints 701 and 702. The following description is directed toward the differences between the first exemplary embodiment and the current exemplary embodiment; therefore additional description of components which are shared by both embodiments will be omitted. The same reference numerals will be used in relation to similar components in each embodiment. The expansion components 600 may be any of several devices as are well known in the art, exemplary embodiments of which include tubes of different diameters, wherein the smaller diameter tube is disposed within the larger diameter tube and the extension of the smaller tube from within the larger tube is controlled by a contact mechanism such as a screw or a lever. The positionable joints 700 may be any of several devices as are well known in the art, exemplary embodiments of which include hinges with adjustable resistance so they may be bent and fixed into a predetermined position.

As shown in FIG. 2, the vertical positioning member 200 may include expansion components 601, 602 and 603, and 604 disposed on the first prong 210, the connecting body 230, and on the second prong 220, respectively. The expansion components 601-604 allow for the prongs 210 and 220, and the connector body 230 to be extended to fit vehicle seatbacks and headrests of various sizes by extending the length of the individual components.

Similarly, the height extending section 300 may include expansion components 605, 606 and 607 disposed on the first portion 310, the second portion 320 and the third portion 330, respectively. The expansion components 605-607 allow for the height extending section 300 to be extended to fit vehicle seatbacks of various sizes by adjusting the length of individual components thereof.

In addition, the height extending section 300 includes first and second positionable joints 701 and 702. In the present exemplary embodiment the first and second positionable joints 701 and 702 are disposed between the first portion 310 and the second portion 320 and between the second portion 320 and the third portion 330, respectively. The positionable joints 701 and 702 allow for the pet food/beverage dispensing apparatus 100 to closely fit the contours of various vehicle seatbacks of different shapes and sizes.

Alternative exemplary embodiments include configurations wherein the positionable joints 701 and 702 are disposed in various other positions in the pet food/beverage dispensing apparatus 100 as would be obvious to one of ordinary skill in the art.

The dish receptacle may be configured to be expanded in first and second directions by expansion components 608-613 disposed on the loop 410.

Alternative exemplary embodiments include configurations wherein one or more of the expansion components 600 are omitted or wherein additional expansion components 600 are added, as would be obvious to one of ordinary skill in the art. Alternative exemplary embodiments include configurations wherein one or both of the positionable joints 700 are omitted or wherein additional positionable joints 700 are added, as would be obvious to one or ordinary skill in the art. In addition, the expansion components 600 may be replaced with reduction components (not shown) which reduce the length of individual components.

Figure 3A:
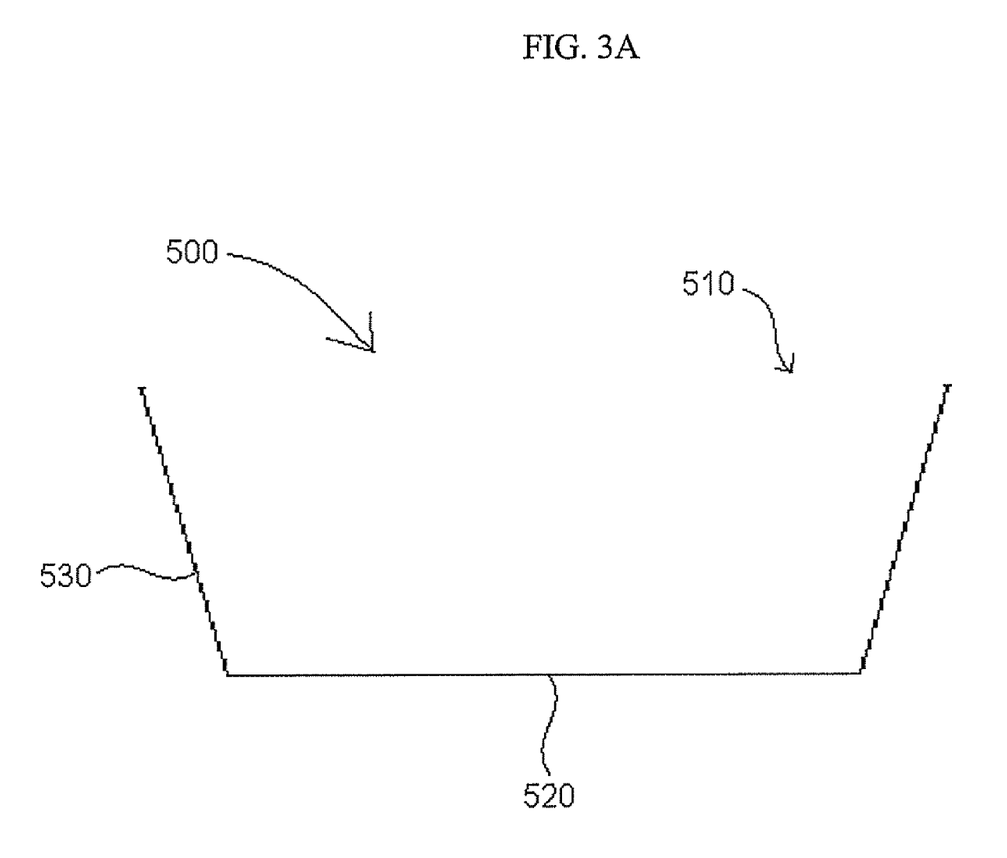
FIG. 3A is a cross-sectional view taken along line I-I' of FIG. 1 illustrating a first exemplary embodiment of a pet food/beverage dish of a pet food/beverage dispensing apparatus according to the present invention.
Figure 3B:
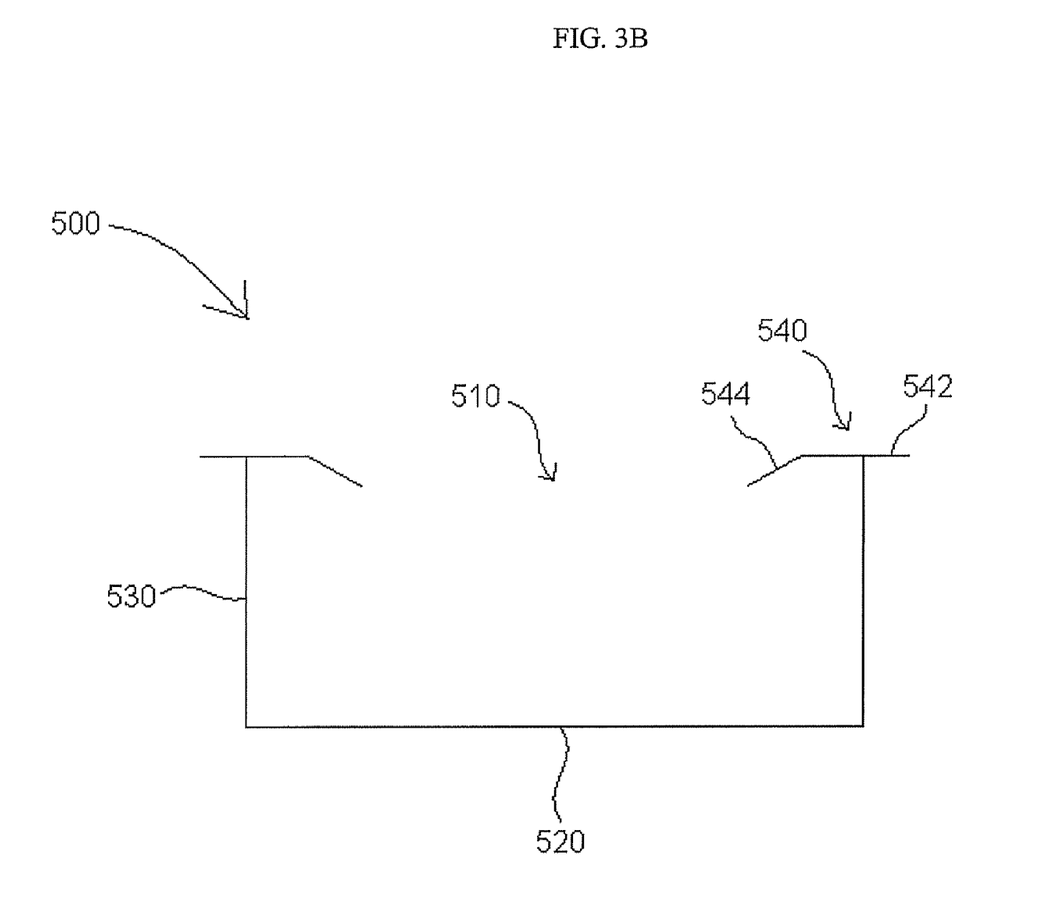
FIGS. 3B and 3C are cross-sectional views of alternative exemplary embodiments of a pet food/beverage dish of a pet food/beverage dispensing apparatus according to the present invention.
Figure 3C:
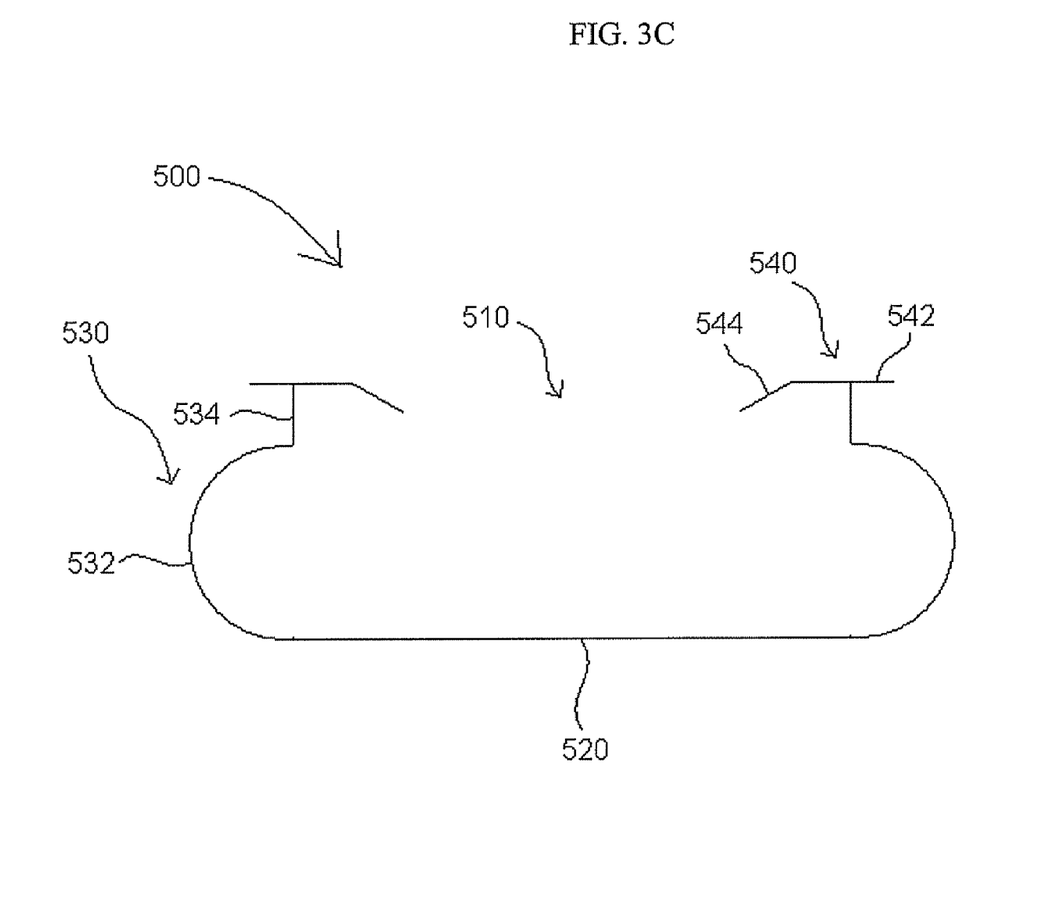

Referring now to FIGS. 3A-C, a cross-sectional view taken along line I-I' of FIG. 1 illustrating a first exemplary embodiment of a pet food/beverage dish 500 of a pet food/beverage dispensing apparatus 100 according to the present invention is illustrated in FIG. 3A. Cross-sectional view of alternative exemplary embodiments of a pet food/beverage dish 500 of a pet food/beverage dispensing apparatus 100 according to the present invention are shown in FIGS. 3B and 3C.

As shown in FIG. 3A, a first exemplary embodiment of a dish 500 includes an opening 510, a bottom 520 and sides 530. The cross-sectional view shows that the sides 530 are angled away from the bottom 520, this creates a dish 500 having a circumference which varies according to the height of the dish 500. This exemplary embodiment of a dish 500 is configured to fit a dish receptacle 400 having a loop 410 with at least four sides.

As shown in FIG. 3B, a second exemplary embodiment of a dish 500 includes an opening 510, a bottom 520, sides 530 and a lid 540. The cross-sectional view shows that the sides 530 are disposed substantially perpendicular to the bottom 520. The sides may be coupled to a lid 540. Similar to the first exemplary embodiment, the bottom 520 has a circumference substantially smaller than a circumference of the loop 410, thereby allowing the bottom 520 to pass therethrough. However, unlike the first exemplary embodiment, in the second exemplary embodiment the circumference of the dish 500 does not linearly increase with height. Therefore, the lid 540 is configured to be retained by the loop 410. The lid may include outward projections 542 which effectively increase the circumference of the dish 500. In addition, the lid 540 may include inward projections 544 configured to retain the contents of the dish 500. Alternative exemplary embodiments include configurations wherein the inward projections 544 are omitted. Alternative exemplary embodiments also include configurations wherein inward projections 544 are added to any of the other exemplary embodiments of a dish 500.

As shown in FIG. 3C, a third exemplary embodiment of a dish 500 includes an opening 510 and a bottom 520 and sides 530. Unlike the previous exemplary embodiments, the sides 530 of the current exemplary embodiment include rounded sections 532 connected to straight portions 534. The rounded sections 532 are configured to retain the contents of the dish 500; food or beverages which shift during travel will be constrained by upper portions of the rounded sections 532. However, in one exemplary embodiment the largest circumference of the rounded sections 532 may be larger than the circumference of the loop 410. In such an exemplary embodiment, the dish 500 is inserted into the dish receptacle 400 from underneath, and then a lid 540 may be disposed on the straight portions 534 to retain the dish 500. In another exemplary embodiment the largest circumference of the rounded sections 532 may be smaller than the loop 410. In such an exemplary embodiment the dish 500 may be inserted into the dish receptacle 400 from above or below and then a lid 540 may be disposed on the straight portions 534 to retain the dish 500.

Alternative exemplary embodiments include configurations wherein the dish 500 has a variety of different configurations as would be apparent to one of ordinary skill in the art, providing that the dish 400 is retained by the dish receptacle 400.

Figure 4:
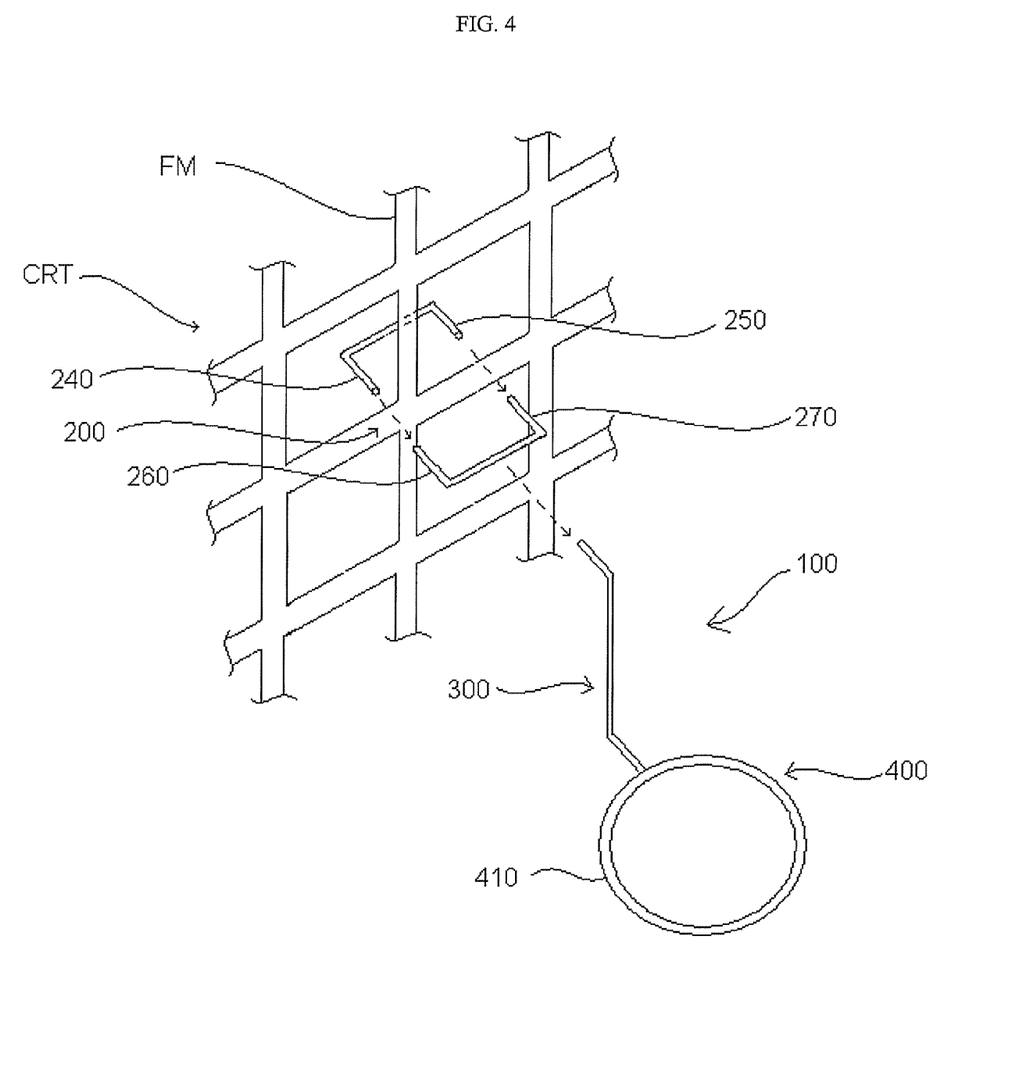
FIG. 4 is an exploded view of another exemplary embodiment of a pet food/beverage dispensing apparatus according to the present invention.

Referring now to FIG. 4, an alternative exemplary embodiment of a pet food/beverage dispensing apparatus 100 includes a vertical positioning member 200 configured to utilize a single substantially vertical fixing member, such as in a vehicle with headrests having one support column. Also shown is a dish receptacle 400 configured to retain round dishes 500.

While the previous exemplary embodiments of the present invention have been described in relation to a pet food/beverage dispensing apparatus for use in a vehicle, the present invention is not limited thereto, but instead may be applied to any situation wherein it is desirable to lift a dish above a certain surface, e.g., a floor. One such exemplary embodiment includes configurations wherein the pet food/beverage apparatus 100 is configured to be used in a pet-training crate CRT. The present exemplary embodiment wherein the vertical positioning member 200 is configured to utilize a single substantially vertical fixing member VFM will be described in relation to such an application.

In the present exemplary embodiment, the vertical positioning member 200 includes a first connecting body 240 and a second connecting body 250, wherein the first and second connecting bodies 240 and 250 are coupled together. In one exemplary embodiment the first and second connecting bodies 240 and 250 form a "U"-shape. The first and second connecting bodies 240 and 250 are disposed on an outside of the crate CRT and aligned with a singular substantially vertical fixing member FM. Then, third and fourth connecting bodies 260 and 270, which are also coupled together, are inserted inside of the crate CRT and connected to the first and second connecting bodies 240 and 250. In one exemplary embodiment the third and fourth connecting bodies 260 and 270 form a "U"-shape.

The height adjusting portion 300 is then coupled to the third and fourth connecting bodies 260 and 270. In an alternative exemplary embodiment the third and fourth connecting bodies 260 and 270 may be integrally and indivisibly formed with the height connecting body 300.

Thereby, the pet food/beverage dispensing apparatus 100 is prevented from moving in a horizontal plane by the interaction between the substantially vertical fixing members FM and the connecting bodies 240-270; e.g., the pet food/beverage dispensing apparatus 100 is prevented from moving horizontally left by the connecting bodies 250 and 270 hitting the fixing members FM, the pet food/beverage dispensing apparatus 100 is prevented from moving horizontally right by the connecting bodies 240 and 260 hitting the fixing members FM, the and the pet food/beverage dispensing apparatus 100 is prevented from moving horizontally forward and backward by the connecting members 240-270 hitting the fixing members FM and the height extending section 300 hitting a lower portion of the crate CRT.

The present exemplary embodiment also includes a dish receptacle 400 having a circular loop 410. This circular loop may accommodate dishes 500 having a rounded shape. As described above, the shape of the loop 410 may be configured in various sizes and shapes as would be apparent to one of ordinary skill in the art, and the circular loop 410 is included herein for illustrative purposes.

Thereby a pet owner may supply a pet with food or beverages to a pet while traveling while reducing or effectively eliminating spillage and the tracking of the food or beverages throughout a vehicle. The dish will be substantially maintained in position with respect to the vehicle by the pet food/beverage dispensing apparatus, thereby reducing, or effectively preventing, spillage of the contents of the dish 500 due to shifting of the dish during travel. In addition, the pet food/beverage dispensing apparatus maintains the dish in a position off of the floor or seats of the vehicle, or the floor of a crate CRT, thereby reducing, or effectively preventing, the pet from stepping in the contents of the dish and tracking said contents throughout the vehicle.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pet food/beverage dispensing apparatus comprising:
   a vertical positioning member configured to at least partially surround at least one substantially vertical fixing member;
   a height extending portion coupled to the vertical positioning member via a refastenable connector; and
   a dish receptacle which is configured to removably retain a dish and is coupled to the height extending portion,
   wherein the vertical positioning member and the height extending portion are configured to substantially fix the dish receptacle in a predetermined position,
   wherein the height extending section comprises:
      a first portion coupled to the vertical positioning member;
      a second portion extending substantially vertically from the first portion; and
      a third portion extending substantially horizontally from the second portion,
   wherein the dish receptacle is coupled to the third portion, and
   further comprising at least one positionable joint disposed between one of the first portion and the second portion and the second portion and the third portion.

2. The apparatus of claim 1, further comprising:
   at least one expansion component disposed in at least one of the vertical positioning member, the height extending portion and the dish receptacle.

3. The apparatus of claim 1, further comprising:
   at least one positionable joint disposed in at least one of the vertical positioning member, the height extending portion and the dish receptacle.

4. The apparatus of claim 1, wherein the vertical positioning member comprises:
   a first prong;
   a connecting body coupled to the first prong; and
   a second prong coupled to the connecting body,
   wherein the height extending section is coupled to the vertical positioning member via the connecting body.

5. The apparatus of claim 1, wherein the vertical positioning member comprises:
   a first connecting body;
   a second connecting body coupled to the first connecting body;
   a third connecting body disposed substantially opposite to the first connecting body; and
   a fourth connecting body coupled to the third connecting body and disposed substantially opposite to the second connecting body,
   wherein the first and second connecting bodies together form a shape having at least two projections, and wherein the third and fourth connecting bodies together form a shape having at least two projections and further wherein the at least two projections from the first and second connecting bodies are configured to be aligned with the at least two projections from the third and fourth connecting bodies.

6. The apparatus of claim 1, wherein the dish receptacle comprises a closed loop having a first circumference.

7. The apparatus of claim 6, further comprising:
   a dish configured to be supported by the dish retaining receptacle.

8. The apparatus of claim 7, wherein the dish comprises:
   a bottom having a second circumference; and
   at least one sidewall having at least one side thereof coupled to the bottom and another side defining an opening having a third circumference,
   wherein the second circumference is substantially smaller than the first circumference and the third circumference is substantially larger than the first circumference.

9. The apparatus of claim 7, wherein the dish comprises:
   a bottom having a second circumference;
   at least one sidewall extending substantially perpendicularly from the bottom; and
   a lid having a third circumference coupled to the at least one sidewall,
   wherein the second circumference is substantially smaller than the first circumference and the third circumference is substantially larger than the first circumference.

10. The apparatus of claim 7, wherein the dish comprises:
    a bottom having a second circumference;
    at least one sidewall having a first portion extending from the bottom and a second portion extending from the first portion; and
    a lid having a third circumference coupled to the second portion of the sidewall,
    wherein the second circumference is substantially smaller than the first circumference and the third circumference is substantially larger than the first circumference, and
    wherein the first portion of the at least one sidewall is configured to have a semicircular cross-sectional profile.

11. The apparatus of claim 7, wherein the dish further comprises:
    a lid comprising:
       a lid body;
       at least one outward projection disposed on the lid body, the outward projection increasing the circumference of the lid; and
       at least one inward projection disposed on the lid body, the inward projection configured to reduce spillage from the dish.

12. A pet food/beverage dispensing apparatus comprising:
    a vertical positioning member configured to at least partially surround at least one substantially vertical fixing member;
    a height extending portion coupled to the vertical positioning member via a refastenable connector; and a dish receptacle which is configured to removably retain a dish and is coupled to the height extending portion, wherein the vertical positioning member and the height extending portion are configured to substantially fix the dish receptacle in a predetermined position, wherein the height extending section is configured to fit the contours of a vehicle seatback, and further comprising one of a hook and loop fastener coupled to the height extending section and the other of the hook and loop fastener is coupled to the vehicle seatback.

13. A pet food/beverage dispensing apparatus comprising:

a vertical positioning member including:

a first prong disposed at a ninety degree angle to a connecting body; and a second prong connected at a ninety degree angle to the connecting body, wherein the first and second prongs and the connecting body are configured to at least partially surround at least one substantially vertical fixing member;

a height extending portion coupled to the vertical positioning member via a refastenable connector, and contoured to fit a back of a vehicle seat, the height extending portion including:

a first portion coupled to the connecting body via the refastenable connector;

a second portion extending substantially perpendicularly from the first portion;

a third portion extending substantially perpendicularly from the second portion; and at least one positionable joint disposed between one of the first portion and the second portion and the second portion and the third portion;

a dish receptacle which is configured to removably retain a dish and is coupled to the third portion of the height extending portion;

a dish configured to be retained by the dish receptacle; and wherein the vertical positioning member and the height extending portion are configured to substantially fix the dish receptacle in a predetermined position.

* * * * *